United States Patent
Farrington et al.

(10) Patent No.: US 8,927,170 B2
(45) Date of Patent: Jan. 6, 2015

(54) FLOW FIELD PLATE FOR REDUCED PRESSURE DROP IN COOLANT

(75) Inventors: Simon Farrington, Vancouver (CA); Richard Fellows, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 488 days.

(21) Appl. No.: 13/108,075

(22) Filed: May 16, 2011

(65) Prior Publication Data

US 2012/0295178 A1   Nov. 22, 2012

(51) Int. Cl.
*H01M 8/04* (2006.01)
*H01M 8/02* (2006.01)

(52) U.S. Cl.
CPC .......... *H01M 8/0206* (2013.01); *H01M 8/0213* (2013.01); *H01M 8/0267* (2013.01); *H01M 8/0258* (2013.01); *Y02E 60/50* (2013.01)
USPC .......................................... 429/437; 429/514

(58) Field of Classification Search
None
See application file for complete search history.

(56) References Cited

U.S. PATENT DOCUMENTS

| | | | |
|---|---|---|---|
| 2004/0151975 A1 * | 8/2004 | Allen | 429/38 |
| 2007/0275288 A1 * | 11/2007 | Goebel et al. | 429/38 |
| 2008/0311461 A1 | 12/2008 | Farrington et al. | |

FOREIGN PATENT DOCUMENTS

GB   2339068 A   *   1/2000

* cited by examiner

*Primary Examiner* — Patrick Ryan
*Assistant Examiner* — Lucas J O Donnell
(74) *Attorney, Agent, or Firm* — Patent Central LLC; Stephan A. Pendorf (57) ABSTRACT

The pressure drop associated with the coolant flow in the coolant transition regions of a typical high power density, solid polymer electrolyte fuel cell stack can be significant. This pressure drop can be reduced by enlarging the height of the coolant ducts in this region of the associated flow field plate so that the ducts extend beyond the plane of the plate. The height change can be accommodated by offsetting the ducts in adjacent cells in the stack and by employing non planar MEAs in this region. By reducing the pressure drop, improved coolant flow sharing is obtained.

11 Claims, 5 Drawing Sheets

FLOW FIELD PLATE FOR REDUCED PRESSURE DROP IN COOLANT

BACKGROUND

1. Field of the Invention

This invention relates to flow field plate designs for reducing the pressure drop in the coolant flow in the coolant transition regions between the ports and the flow fields in solid polymer electrolyte fuel cell stacks.

2. Description of the Related Art

Solid polymer electrolyte or proton exchange membrane fuel cells (PEMFCs) electrochemically convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1 V, a plurality of cells is usually stacked together in series for commercial applications. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required.

Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants.

To provide both reactants and the coolant to and from the individual cells in the stack, a series of ports are generally provided at opposing ends of the individual cells such that when the cells are stacked together they form manifolds for these fluids. A further design feature required then are passageways to distribute the bulk fluids to and from the various channels in the reactant and coolant flow field channels in the plates. Herein, the regions associated with the coolant are referred to as the coolant transition regions. The coolant transition regions can themselves comprise numerous fluid distribution channels, e.g. oxidant and/or fuel transition channels.

For ease of manufacture and other reasons, a common stack design employs a stack of generally rectangular, planar fuel cells whose flow field plates comprise numerous straight reactant and coolant flow field channels running from one end of the plates to the other. Further, it can be advantageous to employ a stack configuration in which certain of the ports are located on the side of the plates and thus are not in line with the flow field channels. Such a configuration however necessitates directing the associated fluid transverse to the flow field channels in order to fluidly connect the port to the flow field channels in the coolant transition regions. This can be accomplished by forming ducts transverse to any reactant transition channels in these coolant transition regions. As will be more apparent when discussing the Figures below, the presence of such ducts can impede the flow of other fluids in the coolant transition region. Thus, a trade-off can be required between flow through such ducts and flow through other transition channels.

This can be particularly of concern in high power density stack designs that comprise coolant ports located on the sides of the plates and coolant ducts in the coolant transition region that are directed transverse to the flow fields. To achieve the highest power densities, fluid channels are often formed at the limits of reliable manufacturing capability and tolerances. Being a liquid, the coolant flow is subject to greater pressure drops than a gaseous reactant when flowing through ducts or channels of a given size. As a result, the coolant pressure drop can be particularly significant in the coolant transition regions of such high power density stacks, and especially in wider cells where longer transverse coolant ducts must be employed. This can result in non-uniform distribution to and hence non-uniform sharing of the coolant in the coolant flow field channels in the active area of the fuel cell. This in turn increases the risk of overheating (hot spots) and over-drying in the cells on hot days. Also, it can lead to formation of wet spots in the cells, making it difficult to prepare the stack for shutdown in below freezing conditions and also difficult to recover during startup from below freezing conditions. In addition, a high coolant pressure drop necessitates use of a larger, more powerful coolant pump.

The pressure drop can be reduced to some extent by sacrificing space provided for the flow of reactants in the coolant transition region but, depending on port and transition designs, this can result in an unacceptable blocking of the flow of one or both of the reactants. Alternatively, the thickness of the individual fuel cells may be increased and, with it, the height of the coolant ducts in the coolant transition regions. However, the power density of the stack is then undesirably reduced, along with a possible undesirable increase in mass of the stack.

Despite the advances made to date, there remains a need for ever greater power density from fuel cell stacks and more efficient flow field plate designs. This invention fulfills these needs and provides further related advantages.

SUMMARY

The present invention allows for an increase in coolant duct height, and hence coolant flow rate, in the coolant transition regions of such fuel cell stacks without adversely affecting the flow of the reactants in the coolant transition regions and while maintaining the overall volume of the stack. This can be accomplished by increasing the height of the coolant ducts such that the flow field plate surfaces in the coolant transition region are no longer planar and by accommodating this change by staggering the coolant ducts in adjacent cells and using MEAs which are non-planar in this region.

More specifically, the invention includes a method for reducing the pressure drop in the flow of coolant through such fuel cell stacks, flow field plates made for this purpose, and fuel cell stacks using such flow field plates.

A flow field plate of the invention can be either for use at the anode or the cathode of a fuel cell in the stack and comprises: opposing major surfaces for distribution of a reactant (either fuel or oxidant or both) and a coolant respectively,
reactant ports for the inlet and the outlet of the reactant located on opposing ends of the plate, a reactant flow field comprising a plurality of reactant flow field channels formed in the reactant surface of the plate, the reactant flow field channels opposing an active area for the fuel cell in which the surface of the plate is planar over the active area, a coolant transition region at each of two ends of the plate comprising reactant transition channels formed in the reactant surface of the plate, the reactant transition channels fluidly connecting the reactant inlet port and the reactant outlet port to the reactant flow field channels, coolant ports for the inlet and the outlet of the coolant located on the side of the flow field plate adjacent the coolant transition region, a coolant flow field comprising a plurality of coolant flow field channels formed in the coolant surface of the plate, at least one coolant duct formed transverse to the reactant transition channels in one of the coolant transition regions of the coolant surface of the plate, the coolant duct fluidly connected to one of the coolant ports, coolant transition channels formed in the coolant surface of the coolant transition region fluidly connecting the coolant duct to the coolant flow field channels, and is characterized in that the depth of the formed coolant duct is such that the reactant surface of the plate opposite the coolant duct extends beyond the plane of the reactant surface in the planar reactant flow field.

The flow field plate can comprise a plurality of coolant ducts formed transverse to the reactant transition channels in one of the coolant transition regions of the coolant surface of the plate, and preferably in both of the coolant transition regions of the coolant surface of the plate. Such flow field plates can be made of molded carbon or formed metal.

A fuel cell stack of the invention comprises a series stack of a plurality of fuel cells, in which each fuel cell comprises a membrane electrode assembly and two opposing flow field plates as described above. The two opposing flow field plates are an oxidant flow field plate and a fuel flow field plate, and the oxidant flow field plates and the fuel flow field plates in adjacent cells mate together to form a flow field plate assembly in which the coolant flow field channels in each of the oxidant and fuel flow field plates align so as to provide a plurality of closed coolant channels for the passage of coolant through each flow field plate assembly, the coolant ducts of the oxidant flow field plates align with the coolant ducts of the fuel flow field plates in the coolant transition regions at each end of the plates so as to provide for the passage of coolant from the coolant ports to the coolant transition channels in each flow field plate assembly, and the coolant ducts in each flow field plate assembly in the stack are offset in the stack direction from the coolant ducts of the adjacent flow field plate assembly in the stack.

In one embodiment, the coolant ducts in each flow field plate assembly in the stack align with the coolant ducts of every other flow field plate assembly in the stack direction. This can require two or more different sets of anode and cathode plate designs in order to obtain the desired offset of coolant ducts from cell to cell (i.e. two or more different types of oxidant flow field plates and two or more different types of fuel flow field plates). In another embodiment however, the flow field plates can have 2-fold rotational symmetry about an axis normal to the major surface except that the coolant ducts in the two coolant transition regions at each end of the plates are offset. In this way, a fuel cell stack may be assembled with coolant ducts offset from cell to cell using just a single set of anode and cathode plate designs.

In still other embodiments, the coolant ducts in each flow field plate assembly may align with the coolant ducts of every third or greater flow field plate assembly in the stack direction. This however can then require three or more different sets of anode and cathode plate designs.

In order to reduce the coolant pressure drop in accordance with the invention, the depth of the formed coolant ducts is increased such that the reactant surfaces of the plates opposite the coolant ducts extends beyond the plane of the reactant surfaces in the planar reactant flow field, and also the coolant ducts in the stack direction of each flow field plate assembly in the stack are offset with respect to the coolant ducts of the adjacent flow field plate assemblies in the stack. For cells in which the MEA extends into the coolant transition regions, this requires the membrane electrode assemblies to be non-planar in the area of the coolant transition regions. Advantageously, it allows for the depth of the coolant duct in the oxidant flow field plate plus the depth of the coolant duct in an adjacent mated fuel flow field plate to be greater than half the cell pitch in the stack.

These and other aspects of the invention are evident upon reference to the attached Figures and following detailed description.

BRIEF DESCRIPTION OF THE DRAWINGS

FIGS. 1a, b, c and d show schematic surface views of the coolant side of an anode flow field plate, the coolant side of a cathode flow field plate, the fuel side of the anode flow field plate, and the oxidant side of the cathode flow field plate respectively of a prior art PEMFC stack comprising coolant side feed ports and cross feed coolant ducts in the coolant transition regions of the flow field plates. (These Figures are renumbered versions of prior art figures from US2008/0311461.)

FIGS. 4a, b, c and d show schematic surface views of the coolant side of an anode flow field plate, the coolant side of a cathode flow field plate, the fuel side of the anode flow field plate, and the oxidant side of the cathode flow field plate respectively of an exemplary PEMFC stack of the invention. The stack requires two or more different sets of such plates in which the coolant ducts have been offset.

FIGS. 5a, b, c and d show schematic surface views of the coolant side of an anode flow field plate, the coolant side of a cathode flow field plate, the fuel side of the anode flow field plate, and the oxidant side of the cathode flow field plate respectively of another exemplary PEMFC stack of the invention. The plates here have 2-fold rotational symmetry except that the coolant ducts in the two coolant transition regions at each end of the plate are offset such that the stack only requires one set of plates.

DETAILED DESCRIPTION

A PEMFC stack design suitable for automotive purposes typically comprises a series stack of generally rectangular, planar PEM fuel cells. The fuel employed is usually pure hydrogen although other fuels may be considered. Air is usually provided as the oxidant. The individual PEM fuel cells comprise a membrane electrode assembly (MEA) of a polymer membrane electrolyte and two, usually noble metal based, catalyst layers on either side of the membrane electrolyte which serve as the anode and cathode respectively. Gas diffusion layers are usually provided adjacent the catalyst layers in the MEA for several purposes, e.g. to uniformly distribute reactant gases to and by-product fluids from the electrodes, to provide electrical connection to the electrodes, and to provide mechanical support. These gas diffusion layers are engineered porous, electrically conductive structures and typically comprise carbon fibres, binder, and materials to adjust the wetting characteristics of the layers. Flow field plates are then provided adjacent the anode and cathode gas diffusion layers to distribute bulk fluids to and from the gas diffusion layers, to provide mechanical support, to provide a manifold structure for the fluids delivered to and from the cell, and also to provide a structure for circulating liquid coolant to the fuel cells. Other specialized layers or sublayers may also be provided for various purposes in the structure (for instance, between electrode and gas diffusion layer or between gas diffusion layer and flow field plate).

FIGS. 1a, b, c and d show schematic surface views of prior art flow field plates suitable for a high power density, automotive scale PEMFC stack. There are two types of plates involved, one for the anode side of the cell and one for the cathode side. FIGS. 1a and 1c show views of the opposing major surfaces of anode flow field plate 100, and FIGS. 1b and 1d show views of the opposing major surfaces of cathode flow field plate 101. (Note: FIGS. 1a, b, c, and d are renumbered versions of prior art figures from US2008/0311461.)

Both flow field plates have openings provided at opposite ends that serve as inlet and outlet ports for the various fluids being delivered to and from the cells. Seals are also employed around the various ports such that when a plurality of these cells are stacked together in series, the plurality of ports align and seal together so as to form manifolds for the various fluids within the stack. In FIGS. 1a, b, c, and d, the various ports shown are: fuel inlet 102, fuel outlet 103, oxidant inlet 104, oxidant outlet 105, two coolant inlets 106, and two coolant outlets 107. (For purposes of simplicity and clarity, the seal structures involved have been omitted from these Figures.)

FIGS. 1c and 1d show the major surfaces of anode flow field plate 100 and cathode flow field plate 101 that face the electrochemically active anode and cathode in the MEA respectively. In each of these plates, reactant flow fields have been formed comprising a plurality of generally linear flow field channels which extend from one end of the plate to the other. FIG. 1c shows numerous fuel flow field channels 108 which oppose the active area of an anode when assembled into a fuel cell. FIG. 1d shows numerous oxidant flow field channels 109 which oppose the active area of a cathode when assembled into a fuel cell. Between the reactant flow field channels in the plates and the various ports in the plates are coolant transition regions. In these coolant transition regions, various structures are provided for fluidly connecting the various ports to their appropriate flow field channels. In FIG. 1c, the coolant transition regions are denoted as 110. As shown, linear flow field channels 108 extend into coolant transition regions 110 at either end of flow field plate 100. These portions of the channels are denoted as fuel transition channels 111a, 111b. (In actual cells, other distribution structures are usually also formed in coolant transition regions 110 between fuel transition channels 111a, 111b and fuel inlet and outlet ports 102, 103. However, for clarity, these are not shown in FIG. 1c.) Fuel is provided to the associated fuel cell at fuel inlet port 102, is directed through fuel inlet backfeed port 130a to adjacent fuel transition channels 111a, directed through fuel flow field channels 108 and thus to the electrochemically active anode adjacent channels 108, and any remaining fuel and reaction by-products are directed from fuel transition channels 111b, through fuel outlet backfeed port 130b, to adjacent fuel outlet port 103.

In a like manner to FIG. 1c, the coolant transition regions in cathode plate 101 are denoted as 112. Linear flow field channels 109 extend into coolant transition regions 112 at either end of flow field plate 101. These portions of the channels are denoted as oxidant transition channels 113a, 113b. Oxidant therefore is provided to the associated fuel cell at oxidant inlet port 104, is directed through oxidant inlet backfeed port 140a to adjacent oxidant transition channels 113a, directed through oxidant flow field channels 109 and thus to the electrochemically active cathode adjacent channels 109, and any remaining oxidant and reaction by-products are directed from oxidant transition channels 113b, through oxidant outlet backfeed port 140b to adjacent oxidant outlet port 105.

As is typically done in the art, the other sides of flow field plates 100 and 101 are used cooperatively to create coolant flow fields for the cells in the stack. Specifically, for a given cell in the stack, the major surface of the coolant side of its anode flow field plate 100 (shown in FIG. 1a) cooperates with the major surface of the coolant side of the cathode flow field plate 101 (shown in FIG. 1b) of an adjacent cell in the stack to thereby create a coolant flow field. Typically, pairs of anode flow field plates 100 and cathode flow field plates 101 are bonded together to create flow field plate assemblies prior to assembling the rest of the fuel cell stack.

The view in FIG. 1a of anode flow field plate 100 is that of FIG. 1c except rotated 180 degrees about the long axis of the plate. Linear coolant flow field channels 114 are visible here and these extend into coolant transition regions 110 at either end of flow field plate 100. These portions of the channels are denoted as coolant transition channels 115a, 115b.

In a like manner, the view in FIG. 1b of cathode flow field plate 101 is that of FIG. 1d except rotated 180 degrees about the long axis of the plate. Linear coolant flow field channels 118 are visible here and these extend into coolant transition regions 112 at either end of flow field plate 101. These portions of the channels are denoted as coolant transition channels 117a, 117b.

In adjacent cells in the stack, the two surfaces shown in FIGS. 1a and 1b mate and cooperate to form a coolant flow field that is appropriately sealed from the rest of the cell and from the surrounding environment. Coolant is provided at the interface of these adjacent cells at coolant inlet ports 106 and has to be directed to adjacent coolant transition channels 115a, 117a, then directed through coolant flow field channels 114, 118, and then directed out from coolant transition channels 115b, 117b at the other end of the cells to adjacent coolant outlet ports 107.

As is evident in FIGS. 1a, b, c, and d, flow field plates 100, 101 have a side feed design for all of the fuel, the oxidant, and the coolant fluids. That is, fuel ports 102, 103, oxidant ports 104, 105 and coolant ports 104, 105 are located on the sides at the opposite ends of plates 100, 101 and are thus not in line with the linear flow fields 108, 109, 114, 118. As shown, a wide path is available in coolant transition regions 110 for fuel to be directed from fuel inlet backfeed port 130a to fuel transition channels 111a at the inlet end and directed from fuel transition channels 111b to fuel outlet backfeed port 130b at the outlet end of plate 100. However, there are no similar such wide paths available for fluidly connecting coolant ports 106, 107 to coolant transition channels 115a, 115b at each end of plate 100. Instead, coolant ducts 119a, 119b (in anode flow field plate 100) and 120a, 120b (in cathode flow field plate 101) are provided to make a fluid connection between coolant ports 106, 107 and coolant transition channels 115a, 115b, 117a, 117b.

Coolant ducts 119a, 119b, 120a and 120b are required to provide a reasonably sized path for coolant fluid to flow transverse to coolant flow field channels 114, 118 so that coolant is reasonably well distributed to and from all these channels. However, as better illustrated in the view of FIG. 2, the presence of the coolant ducts gets in the way of fuel and oxidant transition channels 111, 113 and vice versa.

Figure 1:
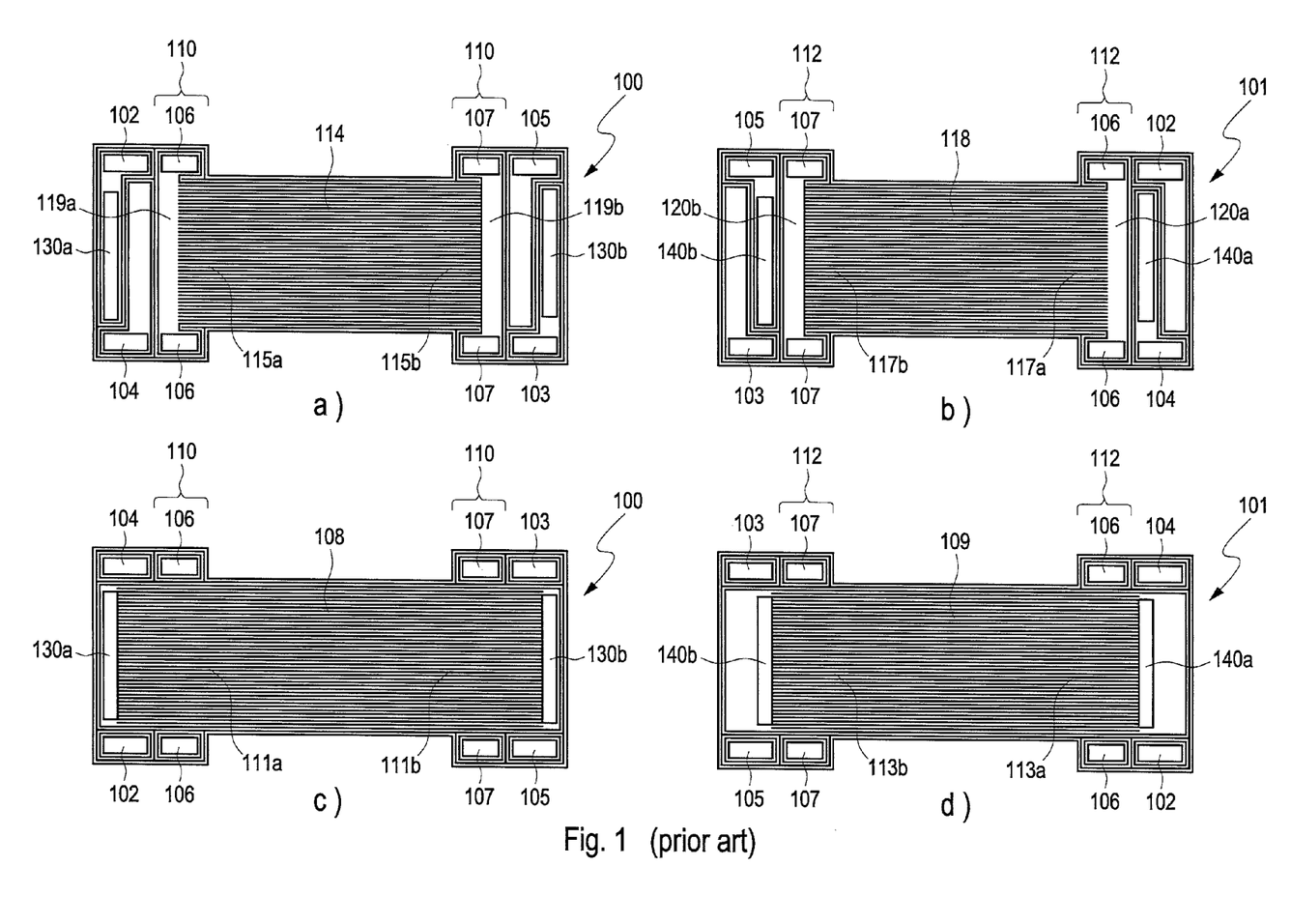
Figure 2:
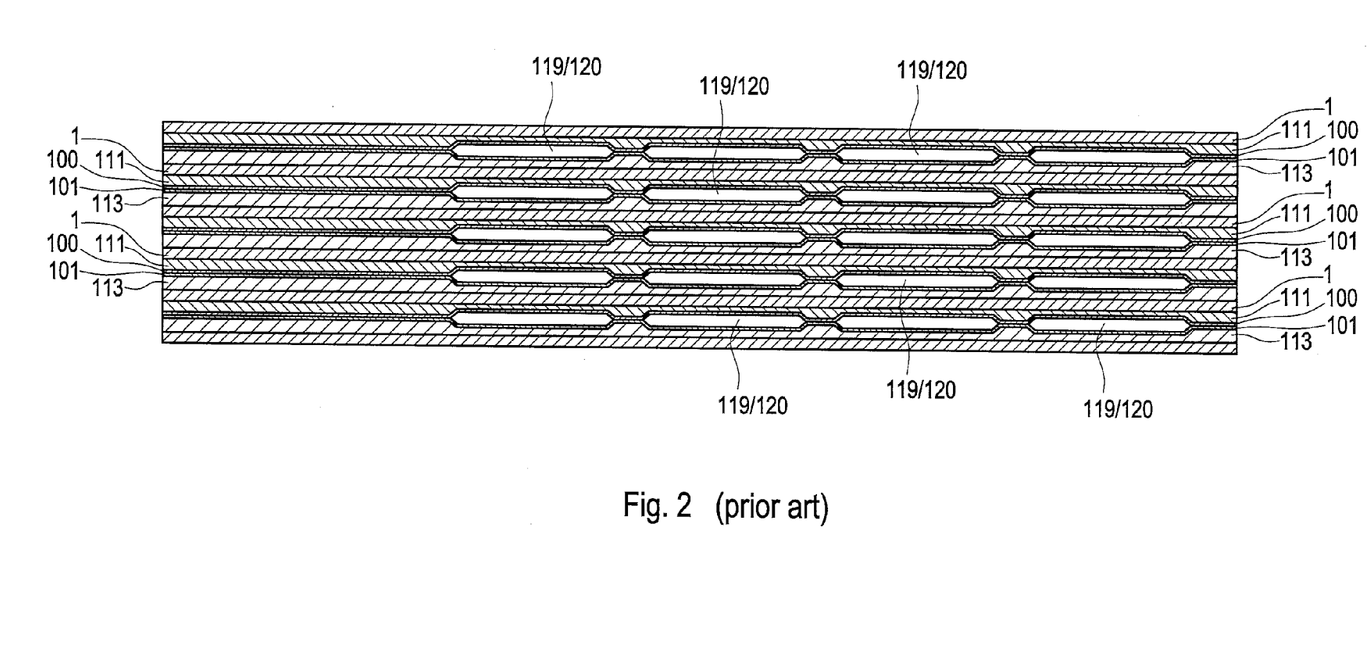
FIG. 2 shows a schematic cross-sectional view of the coolant transition region and coolant ducts of a prior art PEMFC stack comprising coolant side feed ports and multiple transverse coolant ducts in the coolant transition region of the flow field plates.

FIG. 2 shows a schematic cross-sectional side view of coolant transition regions 110, 112 near one end of a few cells in the fuel cell stack. Unlike FIG. 1 however, this prior art embodiment employed multiple transverse coolant ducts. In FIG. 2, vertical represents the stack direction, and horizontal represents the direction of the linear flow field channels 108, 109, 114, 118. The right side of FIG. 2 is near an end of the stack (the actual edge of the stack is not shown in FIG. 2). Each cell comprises a MEA 1, fuel transition channel 111, and oxidant transition channel 113. Anode flow field plates 100 are bonded to cathode flow field plates 101 to form flow field plate assemblies and a plurality of closed coolant ducts 119/120 are formed within these flow field plate assemblies. (Note: coolant duct 119 of anode flow field plate 100 mates with coolant duct 120 of cathode flow field plate 101 to create the closed ducts shown in FIG. 2. The inside height of the created closed duct is thus determined by the sum of the depth of the duct formed in plate 100 plus the depth of the duct formed in plate 101.)

As is evident in FIG. 2, any vertical height devoted to the size of closed coolant ducts 119/120 serves to restrict the flow of reactant in fuel transition channels 111 and oxidant transition channels 113, or vice versa. Thus, when trying to provide the highest power density (and hence minimum size) fuel cell stack, a trade-off must be made between reactant flow capability and coolant flow capability in the coolant transition regions. In practice, a plurality of coolant ducts 119/120 may be employed in order to obtain a satisfactory flow of coolant transverse to the various linear flow fields, without unacceptably blocking reactant flows in transition channels 111, 113.

In the prior art flow field plates shown in FIGS. 1 and 2, the surfaces of the plates are generally planar throughout and, as partly shown in FIG. 2, MEAs 1 in the individual cells are also generally planar throughout the cells.

The present invention however overcomes some of the limitations of the prior art plate and stack designs illustrated in FIGS. 1 and 2. The flow resistance in the coolant ducts can be lowered by reshaping and also enlarging them without significant impact on the flow of other reactants and without increase in the height of the fuel cell stack. This can be accomplished by increasing the depth of the coolant ducts while offsetting or staggering the coolant ducts in the stack direction between adjacent cells as shown in FIG. 3.

Figure 3:
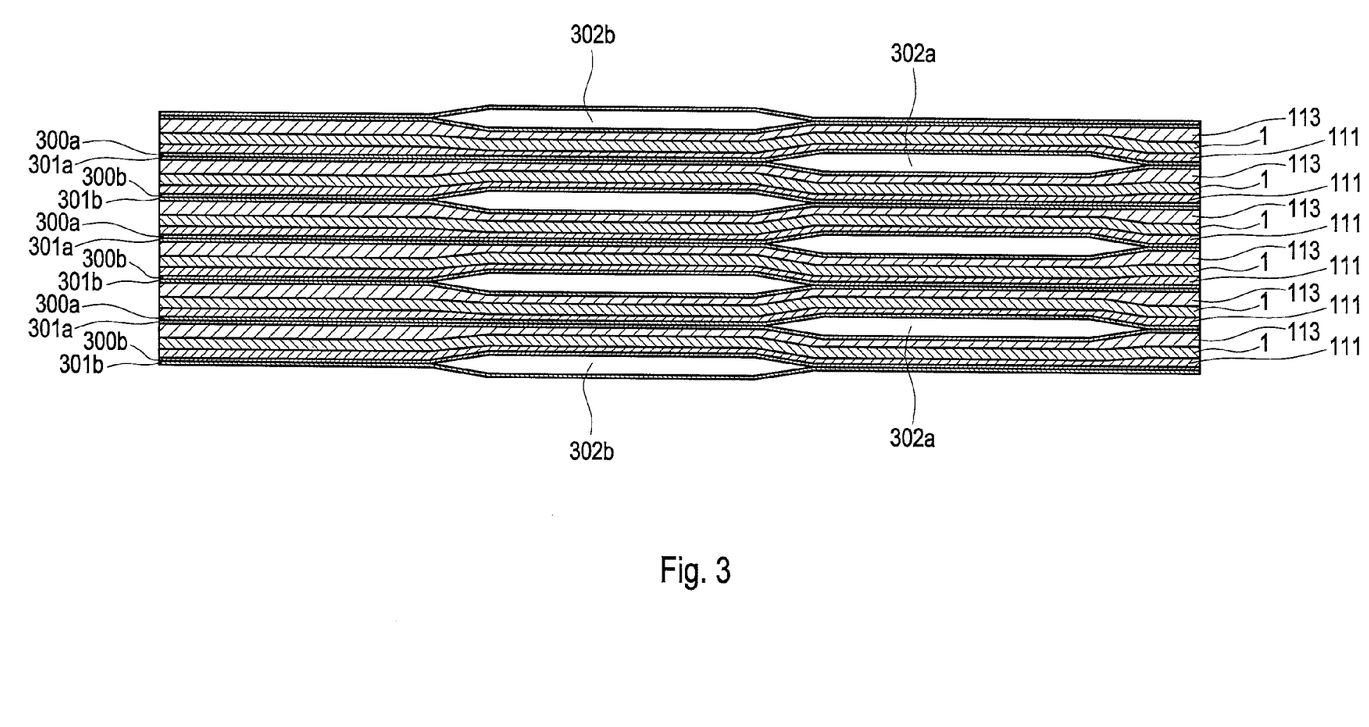
FIG. 3 shows a schematic cross-sectional view of the coolant transition region and coolant ducts of an exemplary PEMFC stack of the invention in which the coolant ducts are enlarged and offset from those in adjacent cells in the stack.

FIG. 3 shows a schematic cross-sectional view of the coolant transition region and coolant ducts of an exemplary PEMFC stack of the invention in which the coolant ducts are enlarged and offset from those in adjacent cells in the stack. In order to compare easily with FIG. 2, a similar view has been shown and similar numbering has been used for MEAs 1, fuel transition channel 111, and oxidant transition channel 113. Again, multiple coolant ducts are provided. However here, the coolant ducts appear in two different positions along the horizontal axis. Closed coolant ducts 302a appear at one location and are created by bonding anode flow field plates 300a to adjacent cathode flow field plates 301a to form a first type of flow field plate assembly. And closed coolant ducts 302b appear at a second location and are created by bonding anode flow field plates 300b to adjacent cathode flow field plates 301b to form a second type of flow field plate assembly. The coolant ducts are therefore offset in adjacent flow field plate assemblies while the coolant ducts align in every other flow field plate assembly in the stack. This configuration allows for the height of the formed coolant ducts to be increased without significant impact on the flow of other reactants in the adjacent reactant transition channels. However, the coolant ducts have been enlarged such that reactant surfaces of the plates opposite the coolant ducts extends beyond the plane of the reactant surfaces in the planar reactant flow fields. In other words, MEAs 1 can no longer lie flat or planar adjacent either of coolant ducts 302a and 302b.

Increasing the height of coolant ducts 302a and 302b allows for somewhat of an increase in flow rate even without increasing the total cross-sectional area of the ducts since it allows for a reduction in the duct perimeter. However, the total cross-sectional area may preferably be increased as well in order to provide a more substantial increase in flow rate or conversely a substantial reduction in coolant pressure drop over the length of the coolant ducts.

To accommodate the modifications shown in FIG. 3 however, it is required that MEAs 1 be flexible enough to conform to the non-planar surfaces in these coolant transition regions. Further, attention must be paid to the possibility that such designs may make stack assembly more sensitive to misalignment in these areas. Those skilled in the art are familiar with MEA designs that allow for the necessary flexibility and can be expected to accommodate for the possibility of manufacturing and other related misalignments in the cell design.

Figure 4:
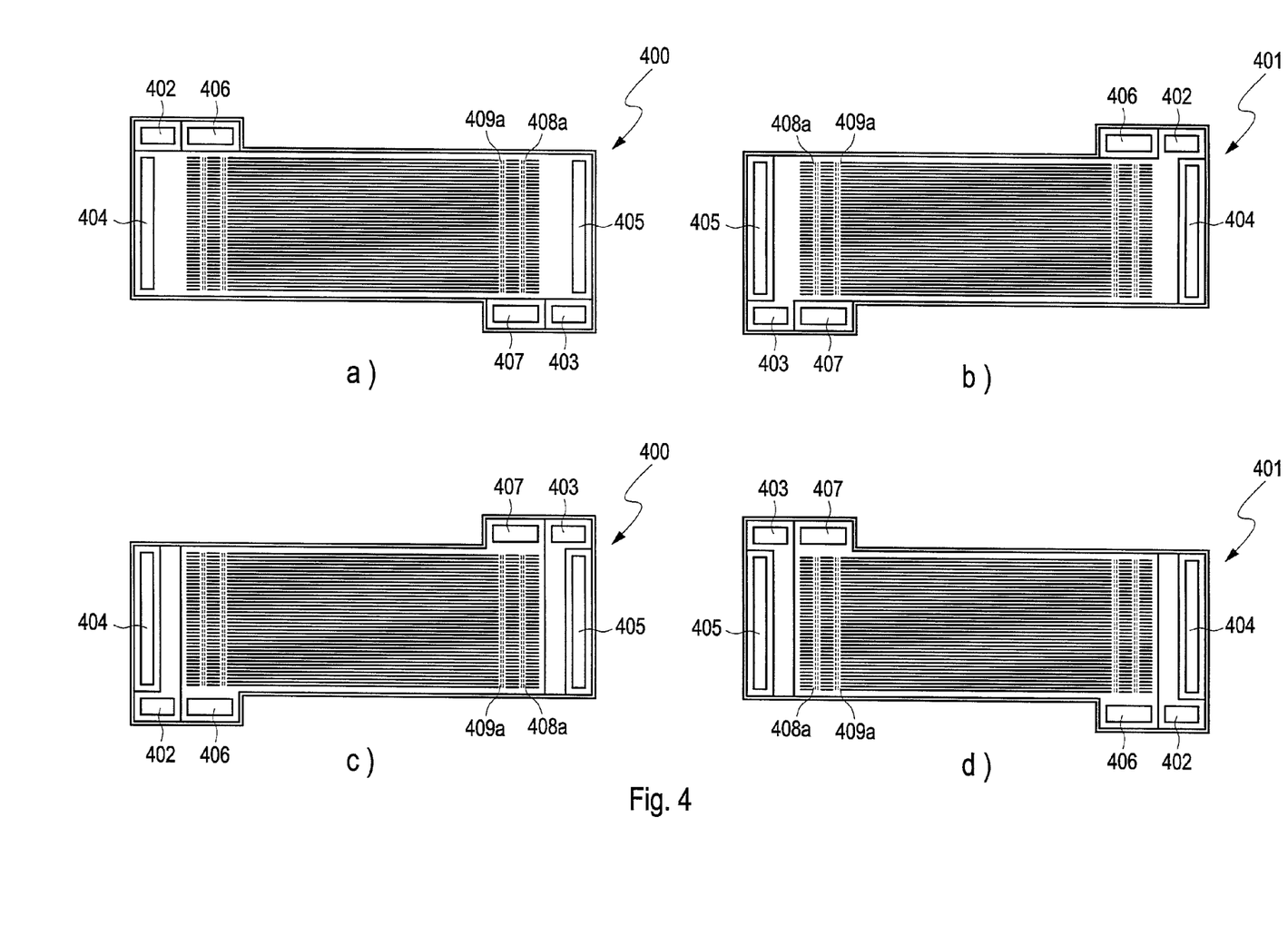

Another consequence of the modifications shown in FIG. 3 is that the plates, or at least their orientation, are not the same from cell to cell in the stack. FIG. 4 depicts a set of plate embodiments that can be used to provide for the first of two types of flow field plate assemblies shown in FIG. 3. Note however that the plates in FIG. 4 have two coolant ducts at each end of the set of plates, while the section view shown in FIG. 3 only shows one of the coolant ducts in each set of plates.

FIGS. 4a, b, c and d show schematic surface views of the coolant side of anode flow field plate 400, the coolant side of cathode flow field plate 401, the fuel side of anode flow field plate 400, and the oxidant side of cathode flow field plate 401 respectively for an exemplary PEMFC stack of the invention. These figures are similar to FIGS. 1a, b, c, and d except for the configuration of the oxidant ports, and that there is only one set of coolant ports instead of two, and that there are multiple coolant ducts in this configuration. For convenience in orienting the reader, the various ports have been numbered, namely fuel inlet 402, fuel outlet 403, oxidant inlet 404, oxidant outlet 405, coolant inlet 406, and coolant outlet 407. However, other identifying numerals similar to those in FIG. 1 have been omitted. Coolant ducts 408a and 409a appear in each of FIGS. 4a, b, c, and d. Coolant duct 408a is located at the equivalent location to coolant duct 302a in FIG. 3. Additional coolant duct 409a is located further from the end of the plate and it should be noted that it is not equivalent to coolant duct 302b in FIG. 3. Plates 400 and 401 can therefore function as plates 300a and 301a in FIG. 3. However, another set of plates is required to function as plates 300b and 301b in FIG. 3. This set of plates may be made similarly to those shown in FIG. 4 except for the location of the coolant ducts.

In another embodiment however, a single set of anode and cathode plate types might be used to achieve the results of FIG. 3. If other cell design considerations allow for it, it is possible to obtain the desired offset of coolant ducts in every other flow field plate assembly using a single set of plates.

Figure 5:
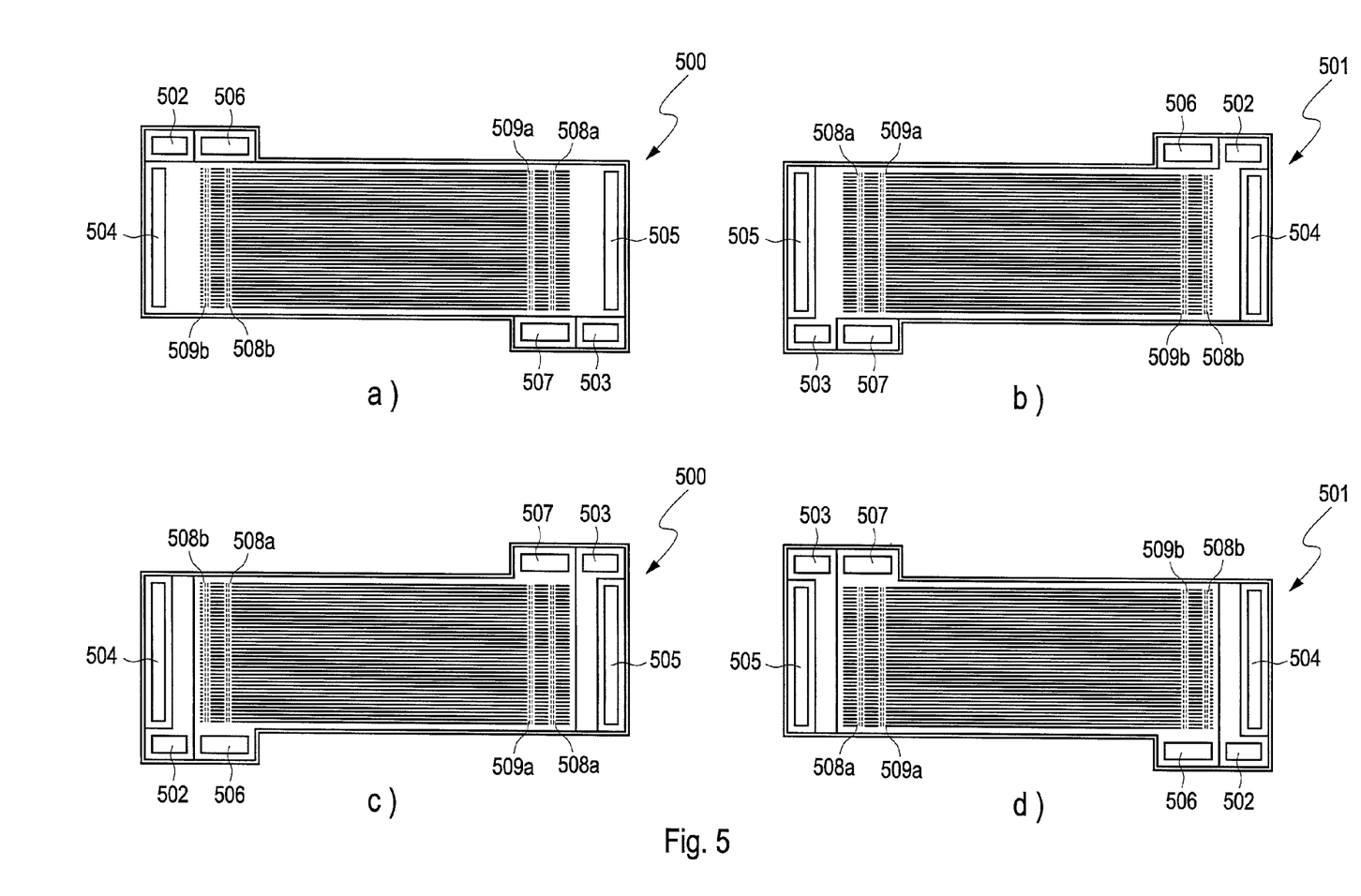

This is illustrated in FIGS. 5a, b, c and d which show schematic surface views of the coolant side of anode flow field plate 500, the coolant side of cathode flow field plate 501, the fuel side of anode flow field plate 500, and the oxidant side of cathode flow field plate 501 respectively of an exemplary set of plates for this purpose. These figures are similar to FIGS. 4a, b, c, and d except for the location of the coolant ducts. Again for convenience, the various ports have been numbered, namely fuel inlet 502, fuel outlet 503, oxidant inlet 504, oxidant outlet 505, coolant inlet 506, and coolant outlet 507. Other identifying numerals similar to those in FIG. 1 have again been omitted. Coolant ducts 508a and 508b appear in each of FIGS. 5a, b, c, and d and are located at the equivalent locations to coolant ducts 408a and 409a in FIG. 4. And thus coolant duct 508a is also located at the equivalent location to coolant duct 302a in FIG. 3. Coolant ducts 508a and 508b also appear in each of FIGS. 5a, b, c, and d and are located to be in equivalent locations to coolant ducts in plates 300b and 301b in FIG. 3. In particular, coolant duct 509b is located at the equivalent location to coolant duct 302b in FIG. 3. Plates 500 and 501 can therefore function at one end as plates 300a and 301a, and can function at the other end as plates 300b and 301b in the flow field plate assemblies shown in FIG. 3. Thus, by rotating the plates (or flow field plate assembly) about an axis normal to plane of FIG. 5, plates 500 and 501 can serve as plates 300b and 301b as well as 300a and 301a in FIG. 3. This option is available to cell designs which have 2-fold rotational symmetry about the stack direction but for the location of the coolant ducts (e.g. the inlet and outlet ports and the coolant transition regions at the inlets and outlets must be the same). An advantage of this design is that only one set of plate types is required.

Other embodiments may be contemplated in order to obtain the advantages of the invention. While less preferred for instance, instead of offsetting the coolant ducts such that the coolant ducts align in every other flow field plate assembly (as shown in FIG. 3), a stack may instead offset the coolant ducts such that the ducts in each flow field plate assembly align with those in every third or greater flow field plate assembly align.

The following example is illustrative of the invention but should not be construed as limiting in any way.

EXAMPLE

The coolant pressure drop benefit of an exemplary flow field plate design of the invention was calculated with regards to a fuel cell stack design intended for use in automotive applications. The automotive stack used a plate design similar to that shown in FIGS. 1a, b, c, and d and FIG. 2. The cell pitch in the stack (i.e. cell to cell spacing in the stack) was 1.2 mm. The total height of the closed coolant ducts formed by adjacent, mated anode and cathode plates in the stack was just 3.1 mm high. This allowed for an acceptable total height of 0.25 mm for the closed oxidant transition channels and a height of 0.15 mm for the closed fuel transition channels.

For comparison, a similar fuel cell stack to the above was considered except that it employed a plate design similar to that shown in FIGS. 3 and 4a, b, c, and d. Here, it was expected that a total height of 0.62 mm for the closed coolant ducts could readily be obtained in molded or formed plates, while maintaining the same oxidant and fuel transition channel heights. Thus the height of the closed coolant duct is greater than half the cell pitch in the stack here. This would be expected to reduce the coolant pressure drop in the coolant transition regions by about a factor of 4.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A flow field plate for a fuel cell comprising:
opposing major surfaces for distribution of a reactant and a coolant respectively;
reactant ports for the inlet and the outlet of the reactant located on opposing ends of the plate;
a reactant flow field comprising a plurality of reactant flow field channels formed in the reactant surface of the plate, the reactant flow field channels opposing an active area for the fuel cell wherein the surface of the plate is planar over the active area;
a coolant transition region at each of two ends of the plate comprising reactant transition channels formed in the reactant surface of the plate, the reactant transition channels fluidly connecting the reactant inlet port and the reactant outlet port to the reactant flow field channels;
coolant ports for the inlet and the outlet of the coolant located on the side of the flow field plate adjacent the coolant transition region;
a coolant flow field comprising a plurality of coolant flow field channels formed in the coolant surface of the plate, wherein the surface of the plate is planar in the active area of each coolant flow field channel;
at least one coolant duct formed transverse to the reactant transition channels in one of the coolant transition regions of the coolant surface of the plate, the coolant duct fluidly connected to one of the coolant ports; and
coolant transition channels formed in the coolant surface of the coolant transition region fluidly connecting the coolant duct to the coolant flow field channels,
wherein the depth of the formed coolant duct is such that the reactant surface of the plate opposite the coolant duct extends beyond the plane of the reactant surface in the planar reactant flow field, and
wherein the flow field plate is configured to stack such that the coolant duct is in alignment with a coolant duct of an adjacent fuel cell, and such that a coolant duct of a second flow field plate of the same fuel cell having a depth such that the reactant surface of the second plate opposite the second plate coolant duct extends beyond the plane of the reactant surface in the planar reactant flow field is offset in the stack direction.

2. The flow field plate of claim 1, comprising a plurality of coolant ducts formed transverse to the reactant transition channels in one of the coolant transition regions of the coolant surface of the plate.

3. The flow field plate of claim 2, comprising a plurality of coolant ducts formed transverse to the reactant transition channels in both of the coolant transition regions of the coolant surface of the plate.

4. The flow field plate of claim 1, wherein the plate is made of molded carbon or formed metal.

5. The flow field plate of claim 1, wherein the plate has 2-fold rotational symmetry about an axis normal to the major surface except that the coolant ducts in the two coolant transition regions at each end of the plate are offset.

6. A fuel cell stack comprising a series stack of a plurality of fuel cells, each fuel cell comprising a membrane electrode assembly and two opposing flow field plates as claimed in claim 1, wherein:
the two opposing flow field plates are an oxidant flow field plate and a fuel flow field plate; and
the oxidant flow field plates and the fuel flow field plates in adjacent cells mate together to form a flow field plate assembly wherein:
the coolant flow field channels in each of the oxidant and fuel flow field plates align so as to provide a plurality of closed coolant channels for the passage of coolant through each flow field plate assembly;
the coolant ducts of the oxidant flow field plates align with the coolant ducts of the fuel flow field plates in the coolant transition regions at each end of the plates so as to provide for the passage of coolant from the coolant ports to the coolant transition channels in each flow field plate assembly;
the coolant ducts in each flow field plate assembly in the stack are offset in the stack direction from the coolant ducts of the adjacent flow field plate assembly in the stack,
the coolant flow field channels formed in the coolant surface of the plates are not the same from cell to cell in the stack;
the membrane electrode assembly is separated from contact with the coolant transition region of the flow field plates by oxidant transition channels and fuel transition channels of the oxidant flow field plate and a fuel flow field plate, and the membrane electrode assemblies are non-planar in the area of the coolant transition regions to accommodate the depth of the formed coolant ducts.

7. The fuel cell stack of claim 6 wherein the coolant ducts in each flow field plate assembly in the stack align with the coolant ducts of every other flow field plate assembly in the stack direction.

8. The fuel cell stack of claim 7 wherein adjacent flow field plate assemblies have 2-fold rotational symmetry about the stack direction.

9. The fuel cell stack of claim 6 wherein the depth of the coolant duct in the oxidant flow field plate plus the depth of the coolant duct in an adjacent mated fuel flow field plate is greater than half a cell pitch in the stack.

10. The fuel cell stack of claim 7 wherein the cells in the stack comprise two different types of oxidant flow field plates and two different types of fuel flow field plates.

11. A method of reducing the pressure drop in the flow of coolant through a fuel cell stack, the fuel cell stack comprising a series stack of a plurality of fuel cells,
each fuel cell comprising a membrane electrode assembly, an oxidant flow field plate and a fuel flow field plate, each of the oxidant and fuel flow field plates having:
opposing major surfaces for distribution of a reactant and a coolant respectively,
reactant ports for the inlet and the outlet of the reactant located on opposing ends of the plate,
a reactant flow field comprising a plurality of reactant flow field channels formed in the reactant surface of the plate, the reactant flow field channels opposing an active area for the fuel cell wherein the surface of the plate is planar over the active area,
a coolant transition region at each of two ends of the plate comprising reactant transition channels formed in the reactant surface of the plate, the reactant transition channels fluidly connecting the reactant inlet port and the reactant outlet port to the reactant flow field channels,
coolant ports for the inlet and the outlet of the coolant located on the side of the flow field plate adjacent the coolant transition region,
a coolant flow field comprising a plurality of coolant flow field channels formed in the coolant surface of the plate,
at least one coolant duct formed transverse to the reactant transition channels in one of the coolant transition regions of the coolant surface of the plate, the coolant duct fluidly connected to one of the coolant ports, and
coolant transition channels formed in the coolant surface of the coolant transition region fluidly connecting the coolant duct to the coolant flow field channels,
wherein the oxidant flow field plates and the fuel flow field plates in adjacent cells in the stack mate together to form a flow field plate assembly such that the coolant flow field channels in each of the oxidant and fuel flow field plates align so as to provide a plurality of closed coolant channels for the passage of coolant through each flow field plate assembly, the coolant ducts of the oxidant flow field plates align with the coolant ducts of the fuel flow field plates in the coolant transition regions at each end of the plates so as to provide for the passage of coolant from the coolant ports to the coolant transition channels in each flow field plate assembly,
the method comprising:
sizing the depth of the formed coolant ducts such that the reactant surfaces of the plates opposite the coolant ducts extends beyond the plane of the reactant surfaces in the planar reactant flow field; and
offsetting the coolant ducts in the stack direction of each flow field plate assembly in the stack with respect to the coolant ducts of the adjacent flow field plate assemblies in the stack such that the coolant flow field channels formed in the coolant surface of the plates are not the same from cell to cell in the stack and the membrane electrode assemblies are non-planar in the area of the coolant transition regions to accommodate the depth of the formed coolant ducts.

* * * * *